United States Patent [19]

O'Dell et al.

[11] Patent Number: 5,344,704

[45] Date of Patent: Sep. 6, 1994

[54] ABRASION-RESISTANT, AESTHETIC SURFACE LAYER LAMINATE

[75] Inventors: Robin D. O'Dell; Joseph A. Lex, both of Pasadena; Alice M. Simon, Odenton, all of Md.

[73] Assignee: Nevamar Corporation, Odenton, Md.

[21] Appl. No.: 43,906

[22] Filed: Apr. 7, 1993

[51] Int. Cl.⁵ .................................................. B32B 5/16
[52] U.S. Cl. .................................... 428/323; 428/141; 428/142; 428/148; 428/149; 428/150; 428/151; 428/172; 428/27; 428/329; 427/180; 427/267; 427/280; 427/288
[58] Field of Search ............... 428/323, 141, 142, 148, 428/151, 149, 150, 172, 27, 329; 427/180, 267, 280, 288

[56] References Cited

U.S. PATENT DOCUMENTS

| | | |
|---|---|---|
| Re. 30,233 | 3/1980 | Lane et al. |
| 2,761,176 | 9/1956 | Welch |
| 2,936,814 | 5/1960 | Yakubik |
| 3,082,179 | 3/1963 | Miller |
| 3,135,643 | 6/1964 | Michl |
| 3,345,239 | 10/1967 | Rochow |
| 3,373,070 | 3/1968 | Fuerst |
| 3,373,071 | 3/1968 | Fuerst |
| 3,608,010 | 9/1971 | Stayner |
| 3,968,291 | 7/1976 | Chevallier |
| 4,044,185 | 8/1977 | McCaskey, Jr. et al. |
| 4,109,043 | 8/1978 | DeLapp |
| 4,112,169 | 9/1978 | Huffman et al. |
| 4,115,509 | 9/1978 | Kendall-Smith |
| 4,118,365 | 10/1978 | James |
| 4,255,480 | 3/1981 | Scher et al. |
| 4,311,757 | 1/1982 | Raghava et al. |
| 4,322,468 | 3/1982 | Raghava |
| 4,327,141 | 4/1982 | Scher |
| 4,374,886 | 2/1983 | Raghava |
| 4,395,452 | 7/1983 | Scher et al. |
| 4,400,423 | 8/1983 | Scher et al. |
| 4,430,375 | 2/1984 | Scher et al. ........................ 428/148 |
| 4,433,070 | 2/1984 | Ross |
| 4,473,613 | 9/1984 | Jaisle et al. |
| 4,499,137 | 2/1985 | Odell |
| 4,517,235 | 5/1985 | Ungar |
| 4,532,170 | 7/1985 | O'Dell et al. |
| 4,544,584 | 10/1985 | Ross |
| 4,567,087 | 1/1986 | O'Dell et al. |
| 4,713,138 | 12/1987 | Ungar et al. |
| 4,713,299 | 12/1987 | Taylor et al. |
| 5,037,694 | 8/1991 | Ungar |
| 5,093,185 | 3/1992 | Ungar et al. |

FOREIGN PATENT DOCUMENTS

| | | |
|---|---|---|
| 600787 | 6/1960 | Canada |
| 836552 | 3/1970 | Canada |
| 1013662 | 12/1965 | United Kingdom |

*Primary Examiner*—John Kight, III
*Assistant Examiner*—Duc Truong
*Attorney, Agent, or Firm*—Browdy and Neimark

[57] ABSTRACT

A thick aesthetic laminate surface layer is achieved by using pre-cured particulates of the impregnating resin along with an initial binder material and preferably also abrasion resistant mineral particles. The protective overcoating may be applied in a thick layer to give gouge resistance and a deep look. Because the impregnating resin and the pre-cured particulates have the same index of refraction, the transparency of the coating and the resultant clarity of the underlying decor sheet are excellent.

32 Claims, No Drawings

ABRASION-RESISTANT, AESTHETIC SURFACE LAYER LAMINATE

FIELD OF INVENTION

The present invention relates to decorative laminates suitable for table and counter tops, wall panels, floor surfacing, tabletops and the like, especially high-pressure decorative laminates, and to a process for producing such laminates.

BACKGROUND

Decorative laminates have been conventionally made by stacking a plurality of layers of paper impregnated with synthetic thermosetting resins. Normally, the assembly consists of a plurality (for example, three to eight) core sheets made from phenolic resin impregnated Kraft paper, above which lies a decor sheet, usually a print or solid color, impregnated with melamine resin. An overlay sheet is often provided on top of the decor sheet which, in the laminate, is made to be as transparent as possible and which provides protection for the decor sheet.

Early attempts to eliminate or simplify or improve the overlay sheet are exemplified in the Fuerst U.S. Pat. No. 3,373,071 and the Michl U.S. Pat. No. 3,135,643. The technique of these patents was to impregnate the decor sheet with plain melamine resin and then apply a thick coating to the surface of the impregnated sheet using a relatively viscous mixture of 2,000–60,000 cp. As a result, the viscous coating dried on the surface of the saturated decor sheet thus in essence forming an overlay sheet in situ. Insofar as is known, laminate made in this fashion never achieved substantial commercial utilization, except possibly for flooring material, probably because the expense involved, including double handling, i.e. first saturating the impregnated sheet and then coating it, did not justify any modicum of improvement over the use of conventional overlay, or more probably because the resultant laminate was not of sufficient quality for commercial purposes, e.g. cracks, creasing, undue stiffness, insufficient overlay transparency, etc.

The manufacture of laminate tile for flooring using similar techniques has been practiced for many years, but solid colors are so lacking in clarity, i.e. muddy-looking, that they are commercially unsatisfactory, and such flooring tile is commercially suitable only for patterns which, because the floor is so far from the eyes can tolerate poor resolution.

A later attempt to provide a more transparent yet fully protective layer over the decor sheet is discussed in the Chevallier U.S. Pat. No. 3,968,291 where barium sulfate is utilized as a particulate filler material in the overlay sheet, the patentee having determined that barium sulfate has an index of refraction which is closer to the melamine resin than other fillers, thereby increasing the transparency of the overlayer and consequently the clarity of the decor sheet therebelow. This product also has never achieved any commercial acceptance, possibly for the same reasons as indicated above relative to the Fuerst and Michl patents.

More recently, the present art has been revolutionized by the development of the NEVAMAR ARP ® technology, reference being made to Scher et al U.S. Pat. Nos. 4,255,480; 4,395,452; 4,430,375; Re 32,152; 4,263,081; 4,327,141; 4,400,423; Ungar et al U.S. Pat. Nos. 4,713,138; 4,517,235; 4,520,062; 5,037,694; 5,093,185; Lex et al U.S. Pat. No. 4,971,855; and O'Dell et al U.S. Pat. Nos. 4,499,137; 4,532,170; and 4,567,087. In the ARP ® technology the overlayer which protects the decor sheet from abrasion is greatly reduced in thickness so as to provide a highly concentrated layer of abrasion resistant particles bound to the upper surface of the upper paper layer, usually the decor sheet. This technology not only provides improved abrasion resistance over earlier technologies, but provides increased transparency because of the ultra-thinness of the protective layer.

The ARP ® technology has served the industry and the public very well, laminate product made according to this technology being recognized as a superior product and being in great demand. Even so, the need continues for a super clear deep look in a decorative laminate having good gouge resistance and NEMA abrasion resistance characteristics, especially such a laminate having a decorative appearance which is clear and bright, but which appears to be below the upper surface of the laminate. Moreover, even in thinner protective coatings, it would be desirable to retain excellent wear and abrasion resistance while reducing pressing plate die wear and tool wear on the tools which are used to cut the laminate.

SUMMARY OF THE INVENTION

It is accordingly an object of the present invention to overcome deficiencies in the prior art, such as those indicated above.

It is another object of the present invention to provide a super clear deep look laminate having NEMA abrasion resistance characteristics.

It is a further object of the present invention to provide an improved decorative laminate, particularly a high pressure decorative laminate meeting all NEMA requirements, which has a thick protective coating over the decor sheet, which thick protective coating has improved transparency as compared with any previously known thick protective coatings, and which thick protective coating provides both abrasion resistance and clarity and transparency similar to those provided by the ultra-thin protective ARP ® laminates.

It is still another object of the present invention to provide an improved laminate product having all of the advantages of both conventional overlay and of ARP ® laminate.

It is still a further object of the present invention to provide an improved decorative laminate product having all of the advantages of ARP ® laminate with the further advantages of reduced tool wear and the capability of providing deep look high gloss wood grains meeting NEMA requirements, floor tiles of improved brightness and clarity in both patterns and solids, improved gouge resistance, and protection of the pressing plate dies from excessive wear.

It is yet a further object of the present invention to provide a decorative laminate meeting NEMA abrasion resistance standards and having a super high gloss mirror finish 15–20 points higher than what is typically produced in the prior art using the same mirror finish pressing plates.

These and other objects of the present invention are achieved by the utilization of a thick resin-rich protective layer, i.e. one on the order of up to 10× the thickness of the ARP ® protective layers, i.e., up to approximately the same thickness as conventional overlay and the cast-in-situ overlays of the early Fuerst and Michl patents typically corresponding to a weight of 25–30 lbs. or more of solids, incorporating a particulate material formed of pre-cured thermoset resin particles of a resin having the same or substantially the same index of refraction as the laminating resin itself.

In contrast to Michl U.S. Pat. No. 3,135,643 and Chevallier U.S. Pat. No. 3,968,291, both of which tried to find and utilize filler materials for their protective layer which would match as closely as possible the refractive index of the laminating resin, the present invention utilizes the principle that the material having the closest index of refraction to the cured laminating resin is the cured laminating resin itself. Therefore, if the laminating resin for the decor sheet is melamine-formaldehyde resin (hereinafter "melamine" resin), as is typical, the major particulate material from which the protective overlayer is formed will be pre-cured melamine resin particles.

The above and other objects and the nature and advantages of the present invention will be more apparent from the following detailed description of various embodiments.

DETAILED DESCRIPTION OF EMBODIMENTS

One of the key features of the present invention is the utilization of pre-cured thermoset resin particles formed of a resin which has the same or substantially the same index of refraction as the uncured or partially cured laminating resin used in the laminating process after the latter has become thermoset during the laminating procedure. What is meant by the term "pre-cured" is that the cure or set of the resin particles has been advanced either to the maximum degree possible or at least to a stage of cure where its melt viscosity is sufficiently high to prevent these particles from dissolving in the liquid laminating resin and/or melting and flowing under usual laminating conditions and thus undesirably saturating into the underlying paper, e.g. the decor paper, during pressing/laminating to form the laminate.

As indicated above, the typical laminating resin normally used to saturate/impregnate the decor and overlay sheets in the conventional high pressure laminating process to produce high pressure decorative laminates meeting NEMA standards is melamine resin, and consequently melamine resin is the preferred laminating resin for use in the upper layer or layers of the present invention. Consequently, the pre-cured thermoset resin particles are also preferably melamine resin. However, other resin systems are possible, e.g. polyesters, urea-formaldehyde, dicyandiamide-formaldehyde, epoxy, polyurethane, curable acrylics and mixtures thereof. The pre-cured polymer particulates can thus be selected from the group consisting of melamine, polyester, epoxy, curable and acrylic, etc. or mixtures thereof.

Under certain conditions and in order to obtain particular effects, it is also possible to use certain non-compatible mixtures of, for example, cured polyester resin particles or polyurethane resin particles together with the cured melamine resin particles and the liquid melamine laminating resin; normally, however, the cured resin is the same as the liquid laminating resin, and any non-compatible cured resin particles are present in only a minor amount.

It is also possible to use mixtures of pre-cured resin particles which are pre-cured to different degrees of set, and indeed it is even possible to use a minor quantity of resin particles which are still capable of partially dissolving in the liquid melamine resin and thus being capable of melting and flowing into the underlying paper, but the quantity of such less cured particles must not be so great that the desired product will not be achieved, i.e., the resultant laminate must have a transparent protective overlayer formed mostly of pre-cured resin. In cases where the transparent overlayer is very thin, however, up to about 50% or more may comprise abrasion resistant mineral particles.

Except for the transparent protective layer overlaying the decor sheet, the laminate of the present invention is suitably made according to standard practice and suitably has a conventional construction, e.g. it can comprise 2 to 8 core sheets formed of phenolic impregnated Kraft paper with a melamine resin impregnated decor sheet thereover, plus the protective layer of the present invention over the decor layer. The final laminate is made in the typical way such as by stacking the core layers on a suitable press or pressing plate die with the protective layer-coated decor sheet thereover, and subjecting the assembly to sufficient heat and pressure between two pressing plate dies for a time sufficient to produce the desired decorative laminate. The conditions of pressing for both high pressure laminate and low-pressure laminate are standard and well known.

The thick transparent protective overlayer coating comprises predominantly the pre-cured thermoset resin particles together with an initial binder material and, optionally and preferably, a small amount of relatively fine particle size abrasion resistant mineral, desirably of mean particle size ranging from 0.5–50 microns, preferably about 1–30 $\mu$m, and most preferably about 1 micron mean particle size. A typical protective overlayer of this type will comprise 15–20 lbs/ream of pre-cured melamine particles and 6 lbs. per ream of $Al_2O_3$ particles. The abrasion resistant mineral particles are preferably present in an amount sufficient to partially coat the larger pre-cured resin particle which can be as large as 250 $\mu$m but are preferably a maximum of 100 $\mu$m. The mineral particles should have a hardness of at least 7 on the Moh scale, and such particles are preferably alumina or a mixture of alumina and silica. In addition to alumina and/or silica, mineral particles may include zirconium oxide, cerium oxide, hard glass beads, silicon carbide and diamond dust. Significant quantities of other materials, such as fiber flock, etc. should be avoided, as these reduce transparency. The initial binder material can be any system-compatible material which holds the protective layer coating in place on the upper surface of the decor sheet prior to completion of the laminating process, including a variety of resin-based adhesive materials which are compatible with the laminating resin system selected, a high viscosity or sticky partially cured resin, or any of the materials which are mentioned as useful as binder materials according to the ARP ® technology, e.g. sodium alginate, fumed silica, microcrystalline cellulose, or mixtures, e.g. Avicel ® which is a blend of mostly microcrystalline cellulose with a small amount of carboxy methyl cellulose (CMC).

Another typical product according to the present invention has a much thinner protective overlayer corresponding to a thickness of 6–8 lbs. per ream of solids, comprising approximately equal quantities of pre-cured resin particles and mineral particles. This is an ARP ®-like product having only approximately half the amount of mineral particles as ARP ® laminate, but full abrasion and wear resistance with improved tool wear and reduced pressing plate die wear.

The protective coating can be applied to the decor sheet in a variety of ways. These are, very briefly, a two-step process analogous to the ARP ® method of Scher et al U.S. Pat. No. 4,255,480, a one-step process analogous to the ARP ® method of Ungar et al U.S. Pat. No. 4,713,138; a transfer process analogous to that of Ungar et al U.S. Pat. Nos. 4,517,235 and 4,520,062; and a varnish application process in which the protective overlayer composition is coated directly onto a wood veneer or the like and then pressed.

In a preferred form for use in the two-step method, the coating composition of the present invention is produced from a mixture of the small particles of alumina or other abrasion resistant particles desirably of about 1 to about 30 micron mean particle size, pre-cured resin particulates having a maximum particle size of 250 $\mu$m and preferably a maximum particle size of 100 $\mu$m, and a lesser amount of microcrystalline cellulose particles, all dispersed in a stable, aqueous slurry. The particles of alumina, of such small size such that they do not interfere with the visual effects in the final product, serve as the abrasion resistant material and the microcrystalline cellulose particles serve as the preferred initial binder material. It will be understood that the initial binder material must be compatible with the resin system utilized in the laminating procedure, usually melamine resin or in the case of certain low-pressure laminates a polyester resin system, and the microcrystalline cellulose serves this function as well as stabilizing the small particles of alumina and pre-cured resin of the surface of the decor sheet.

Thus, a preferred slurry composition contains a mixture of small particles of alumina and the pre-cured resin particulate and a lesser amount of microcrystalline cellulose particles, all dispersed in water. There must be an amount sufficient of the pre-cured resin particulates and preferably the small mineral particles to provide the resultant product with the desired abrasion resistance as discussed above, and there must be an amount sufficient of the initial binder material to retain the mineral particles and pre-cured resin particulates in place on the surface of the decor facing sheet. In general, it has been found that satisfactory results are attained with about 2 to 10 parts by weight of the microcrystalline cellulose for about 20–120 parts by weight of the alumina and pre-cured resin particulates; however, it is possible to work outside this range. The quantity of pre-cured resin particles should be about 1 to 6 parts by weight per part by weight of mineral particles, it being understood that it is not only possible to work outside this range, but that suitable product having a thick transparent protective overlayer can be made without any mineral particles whatsoever.

The quantity of water in the slurry is also dictated by practical considerations, since if there is too little water the slurry becomes so thick that it is hard to apply; conversely, if there is too much water the slurry becomes so thin that it is difficult to maintain a consistent thickness during the coating operation due to running of the slurry. Thus, a slurry containing about 2.0 wt % microcrystalline cellulose and about 24 wt % alumina and pre-cured resin particulates, based on the waters is stable, i.e. the alumina and pre-cured resin particles do not settle out; but if more than about 3.5 wt % microcrystalline cellulose and about 24 wt % alumina and pre-cured resin particulates, based on water, are used, the slurry becomes very viscous and difficult to apply.

The mineral-containing particle composition also desirably contains a small amount of wetting agent, preferably a non-ionic wetting agents, and a silane. The quantity of wetting agent is not critical, but only a very small amount is desirable and excess quantities provide no advantage. Humectant, mold release agent, catalyst and/or defoamer may also be present according to conventional practice.

If a silane is used, it acts as a coupling agent[1] which chemically binds the alumina or other inorganic particles to the pre-cured melamine particles and/or melamine matrix after impregnation and cure, and this provides better initial wear since the alumina particles are chemically bound to the melamine in addition to being mechanically bound thereto and therefore stay in place longer under abrasive wear. The silane should be selected from among those which are compatible with the particular thermosetting laminating resin used, in this regard silanes having an amino group, such as gamma-aminoprophyl trimethoxy silane, are particularly effective for use with melamine resins. The quantity of silane used need not be great and, in fact, as little as 0.5% based on the weight of the particulate mineral is effective to enhance the abrasion resistance of the final laminate; a maximum quantity of about 2% by weight based on the weight of the alumina or other hard particles is suggested since greater quantities do not lead to any significantly better results and merely increase the cost of the raw materials.

Silanes as coupling agents in other arts are known, e.g. in the manufacture of fiberglass tires, grinding wheels and fiberglass reinforced polyester bodies. See the 1976–77 Edition of Modern Plastics Encyclopedia, page 160, which lists some silanes useful with melamine and polyester systems.

After coating with the aforementioned coating composition, the decorative paper is dried and then impregnated in the normal manner with suitable thermosetting resin, e.g. melamine resin or polyester. The coating using micro-crystalline cellulose as the binder must be dried at an elevated temperature before the decor sheet is impregnated with the melamine resin. Thus, a minimum drying temperature is about 140° F. and the preferred drying temperatures are from 240°–270° F. After drying, the impregnated and coated decor paper is laid up with a plurality of resin impregnated core sheets or some other backing material, and lamination is carried out in the usual way under heat and pressure.

Another method for achieving the objects of this invention is the one-step process of depositing a layer of pre-cured resin particulates on the surface of a decor sheet simultaneously with the complete resin saturation of the decor sheet in a single step operation, in which the uncured liquid resin is a carrier for the pre-cured resin particles and the abrasion-resistant mineral particles. This process by which the present invention is achieved is best described as follows:

(1) preparing the mixture of the liquid thermosettable impregnating resin and the coating composition, wherein the coating composition includes the pre-cured synthetic resin particulates in a concentration sufficient to provide the resin deposit of preselected thickness on the laminate surface, and an initial binder material for the pre-cured resin particles, e.g. microcrystalline cellulose or even sticky particles of partially cured melamine resins which initial binder material is compatible with the thermosettable impregnating resin and which will withstand subsequent laminating conditions, the initial binder material being present in an amount sufficient to bind the pre-cured resin particulates to the surface of the unsaturated paper sheet, and the initial binder material also serving to suspend the pre-cured resin particulate material in the liquid thermosettable impregnating resin;

(2) depositing the protective overlayer and impregnating in one operation by coating the mixture of the liquid thermosettable impregnating resin and the coating composition, preferably having a viscosity no greater than about 200–250 centipoise, over a facing surface of the unsaturated paper sheet at a rate such that the unsaturated paper sheet becomes substantially saturated with the liquid thermosettable impregnating resin, and the coating composition becomes deposited on the facing surface; and (3) drying the coated and impregnated paper decor sheet to obtain a decorative sheet ready for lamination.

Optionally, and as noted above, a hard mineral of fine particle size in a concentration sufficient to enhance abrasion resistance without interfering with visibility may be added to the pre-cured resin particulates in step (1), in which case the thickness of the coating can be reduced without loss of abrasion resistance.

The hard mineral that may be used in the cured polymer particulate composition is of fine particle size as described above, preferably between about 0.5 and 9 microns mean particle sizes although larger sizes may be used as indicated above, in quantities sufficient to provide an abrasion-resistant layer without interfering with visibility. It will be understood that the viscosity of the liquid must be sufficient to maintain the mineral particles in suspension along with the pre-cured resin particles.

The one-operation coating/impregnating step can be carried out in one stage or plural stages, i.e. full impregnation can be effected in the same stage as the coating is laid downs or alternatively partial impregnation can be carried out in a first stage continuous process with the coating, followed by an in-line second impregnation from below.

As noted above, the pre-cured synthetic resin particulates are selected from the group consisting of melamine, polyester, epoxy and curable acrylic or the like resins or mixtures thereof. The binder material is preferably a mixture of microcrystalline cellulose with a minor amount of carboxy methyl cellulose, "Avicel" is sold as a mixture of approximately 89% microcrystalline cellulose and 11% carboxy methyl cellulose, It is also possible, although not preferred, for the initial binder material to be the laminating resin itself, in which case the laminating resin must be relatively viscous, in the nature of a syrup or the like.

The preferred composition suitably contains 1 part by weight of "Avicel" to 4–60 parts by weight of the combination of the mineral particles and pre-cured resin particulates. As indicated above, while the ratio of pre-cured resin particulates to mineral particles is subject to wide variation, a suitable range is about 1–6:1. It is also possible to add small additional quantities of carboxy methyl cellulose (or none whatsoever) and a small quantity of silane. It is preferable to include a small quantity of surfactant, as disclosed in U.S. Pat. No. 4,255,480, and a small quantity of solid lubricant to provide scuff resistant, as disclosed in U.S. Pat. No. 4,567,087.

There are six important variables in the formulation, three of which are independent and three of which are dependent, all as explained in U.S. Pat. No. 4,713,138. Decor paper weight, liquid resin content and weight of the abrasion resistant composition are all independent of the formulation. The requirements for these variables are set by outside factors such as colors degree of final saturation, and abrasion resistance. Impregnant resin weight (dry) per ream is dependent on a combination of paper basis weight and resin content. Viscosity is dependent on the total volume of liquid versus the content of particulate material, Therefore, the amount of water added to the liquid resin is dependent on the viscosity achieved by mixing the abrasion-resistant composition and uncut resin, and the additional volume required to reduce the viscosity to the desired level for ease of simultaneous coating and impregnation, usually a value of less than about 250 cp, preferably about 100 cp.

A third method, as indicated above, is a transfer method similar to that of Ungar et al U.S. Pat. Nos. 4,517,235 and 4,520,062. In this type of process, the coating of the present invention is applied to a transfer substrate and dried thereon, The transfer substrate is then applied face down against a fully or partly saturated decor sheet in the normal laminate pressing operation or against another suitable substrate, e.g. a wood veneer layer. After completion of the lamination operation under conditions of sufficient heat, time and pressure, the laminate is peeled away from the transfer substrate, or vice versa, and the protective coating of the present invention will be found to have transferred to the upper surface of the decor sheet or substrate.

The fourth process by which the present invention can be carried out is by a varnish application process. Here, the composition is directly coated onto the substrate, such as a wood veneer, then dried, and finally pressed under heat and pressure.

The preferred embodiments of the present invention use substantially totally cured melamine resin finely ground to a powder that functions as a physical shim between the press plate and the decorative layer during pressing. By choosing a particle that is the same resin as the impregnating resin, the refractive index of the protective overlayer in the finished laminate will be the same, producing a haze free, highly transparent surface on the laminate after pressing. The transparency so achieved is sufficiently clear so that a solid color decor sheet can be used without loss of brightness or shade.

In addition to a clear thick surface coating many other decorative appearances can be obtained by varying the pre-cured resin particulate used and its particulate size. Such decorative appearances include various textures. Interesting visual effects can be obtained by using tinted pre-cured particulates as well. It is contemplated that the variations of appearance are multiple and depend upon particle size, pre-cured resin particulates, quantities, layer thickness and pigmentation. Actual achievement of a desired appearance can be determined based on routine experimentation in view of the present disclosure.

The following examples are offered illustratively:

EXAMPLE I

Melamine resin particulates are made by heating melamine resin at 300° F. until cured. Once cured, the material is ground to the approximate particulate size distribution as follows:

| | |
|---|---|
| 250μ + | 0.02% |
| 180μ + | 0.04% |
| 106μ + | 0.47% |
| 45μ + | 70.60% |
| 25μ + | 22.45% |
| under 25μ − | 6.40% |

A slurry of ingredients comprising 60 parts of the above pre-cured melamine particles and 60 parts of 1 μm mean particle size Al$_2$O$_3$ are prepared in a Waring blender as indicated below. Seven and one-half parts of microcrystalline cellulose (Avicel RC 581) and 2.5 parts of CMC are added to stirred water. After 2 to 3 minutes in the blender, the Avicel is completely dispersed and the aluminum oxide and pre-cured resin particles are stirred in.

The resultant slurry is applied to 50 lb/ream and 65 lb/ream unimpregnated wood grain and kaleidoscope pattern surface print, respectively. The coating is dried at about 265° F. for three minutes. The paper is then saturated in the normal way using melamine formaldehyde resin and is dried in accordance with normal procedures. The resin content is 51–55.6% and the volatile content is 4.6–5.2%. The laminate is made up and pressed using a conventional general purpose cycle, viz. about 290° F., 1000 psi, for about 25 minutes.

EXAMPLE II

Liquid melamine resin (1575 lbs. solids) is prepared for decor paper impregnated according to standard practice, having a density of 1.15 and 37.7% solids. TRITON CF21 surfactant in an amount of 0.001 part by weight is added per 192.8 lbs. of liquid resin. Mixing is carried out at a high speed in a low shear mixer for five minutes. Eleven pounds of Avicel is rapidly added in a manner so as to avoid clumping or the formation of lumps. Immediately thereafter, 47 lbs. of pre-cured melamine resin particles and 47 lbs. of 30μm alumina are rapidly added.

The viscosity is measured after adding 70 gal. of water to provide a viscosity of no greater than 150 centipoise (Brookfield viscometer #3, spindle at 12 rpm).

Printed decor paper weighing 65 lbs/ream is coated at the rate of 196.1 lbs/ream. The paper is dried at an elevated temperature, and laminate is prepared using this paper as in the usual way.

The abrasion results are as follows:

| | Pattern | |
|---|---|---|
| | MR-51 | MR-12 |
| Initial Point (cycles) | 650 | 750 |
| Final Point (cycles) | 1300 | 1525 |
| Wear Rate | 975 | 1138 |
| Rate/100 cycles | 0.015 g | 0.012 g |

EXAMPLE III

Example II was followed above using 20 μm and 25 μm alumina each for two additional samples.

The abrasion results are as follows:

| | Paper Pattern | | | |
|---|---|---|---|---|
| | MR-12 | | MR-51 | |
| Grit size | 20 μm | 25 μm | 20 μm | 25 μm |
| Initial Point (cycles) | 150 | 650 | 275 | 800 |
| Final Point (cycles) | 1000 | 1550 | 550 | 1600 |
| Wear rate | 575 | 1100 | 413 | 1200 |
| Rate/100 cycles | 0.017 g | 0.012 g | 0.031 g | 0.017 g |

EXAMPLE IV

Medium Weight Protective Overlayer

The following formulation was prepared for overcoating and simultaneously saturating a printed decor paper:

150 gallons uncut melamine resin (1,575 lbs.)
70 gallons water
11 lbs. Avicel
92 lbs. 30 μm (mean particle size) aluminum oxide
92 lbs. pre-cured melamine resin particles max. 100 μm
0.27 lbs. Infirnol mold release agent
6.2 lbs. Nacure 3525 melamine resin curing catalyst
32 lbs. diethylene glycol humectant
1.36 lbs. Bubrake defoamer The coating/impregnation was carried out a rate of 57.8 pounds per ream of uncut melamine resin solids, with Avicel being deposited at a rate of 0.66 lbs. per ream, the aluminum oxide at a rate of 5.62 lbs. per ream, the pre-cured melamine resin particles at a rate of 5.62 lbs. per ream and humectant at a rate of 1.64 per ream. After passage through the dryers the decor sheet had a resin content of 52% and a volatile content of 6%.

The decor sheet was pressed into high pressure decorative laminate in the usual way, the resultant laminate meeting all NEMA standards and having excellent abrasion resistance and sliding can wear resistance.

EXAMPLE V

Deep Look, Heavy Gouge Resistant Laboratory Formula

A laboratory impregnation/coating composition was prepared and applied to a decor sheet at the rate of 58.31 lbs. per ream of uncut resin solids, 0.67 lbs. per ream of Avicel, 26.1 lbs. per ream of pre-cured melamine solids having a maximum particle size of 100 μm, and 6.53 lbs. per ream of aluminum oxide. After passage of the paper through the dryer, the resin content of the paper was 60% and the volatile content was 6%. The transparent protective overlayer had a thickness equivalent of more than 20 lbs. per ream of solids. After pressing the decor sheet with several sheets of phenolic resin impregnated core sheets, a laminate is obtained fully meeting NEMA standards, and which additionally has excellent gouge resistance and in which the decor sheet can be clearly and brightly seen, but which appears to be deep within the laminate.

EXAMPLE VI

ARP ® Replacement

The following formulation is prepared for simultaneously coating and impregnating a solid color decor sheet:

195 gallons of uncut melamine resin (2,047.5 lbs.)
50 gallons water
15 lbs. Avicel 2.9 lbs. wax
44 lbs. 15 µm alumina
44 lbs. pre-cured melamine resin particles (maximum size 100 µm)
0.35 lbs. Emerest 2652 to wetting agent
0.32 lbs. Infirnol mold release agent
8.2 lbs. Nacure 3525 catalyst
1.1 lbs. Bubrake defoamer The above composition was applied at a rate of 60.93 lbs. per ream of uncured resin solids, 0.74 lbs. per ream of Avicel; 0.13 lbs. per ream of wax; 2.17 lbs. per ream of alumina and 2.17 per ream of pre-cured melamine resin particles. The so coated and impregnated solid colored decor sheet was then passed through a drying oven in the usual way. When it emerged it had a resin content of 52% and a volatile content of 6%. The decor sheet was used to form a laminate in the usual way. The resultant laminate had excellent abrasion and sliding can resistance, and fully met all NEMA standards. Because of the relatively small quantity of alumina present, tool wear in cutting this laminate is reduced.

ADDITIONAL EXAMPLES

An example is prepared similar to that of Example V above, except without any alumina whatsoever. A product meeting NEMA standards is obtained which has excellent clarity and gouge resistance. The rate of application of the pre-cured particles is 35 lbs. per ream.

Another example is run similar to Example IV, except that the Avicel is replaced by sodium alginate. Results are satisfactory.

Another example is carried out using a formula similar to that of Example I, the formula being coated directly onto the upper surface of a wood veneer panel. After coating and drying, the panel is pressed under heat and pressure to provide a protective coating over the wood panel.

Another trial is carried out for the manufacture of low pressure board, using polyester resin. A Masonite ® board is used as the substrate. A wood grain decor sheet is used and the coating/impregnating formula is similar to that of Example V, except that the pre-cured resin particles are polyester particles and the impregnating resin is the same polyester resin, uncured. The resultant product has excellent abrasion resistance.

Another example is carried out using the formulation of Example VI but with smaller particle size alumina (1 µm mean particle size), more pre-cured melamine resin particles and less alumina particles, i.e. at a ratio of 2:1, but with the same total deposit of about 4.34 lbs. per ream. After drying the decor sheet is pressed against phenolic impregnated core sheets using a mirror finished plate. The resultant laminate has improved glossy, and damage to the finish of the plate die is reduced.

The foregoing description of the specific embodiments reveal the general nature of the invention so that others can, by applying current knowledge, readily modify and/or adapt for various applications such specific embodiments without departing from the generic concept, and, therefore, such adaptations and modifications should and are intended to be comprehended within the meaning and range of equivalents of the disclosed embodiments. It is to be understood that the phraseology or terminology employed herein is for the purpose of description and not of limitation. The patents mentioned above are incorporated by reference.

What is claimed is:

1. In a decorative laminate meeting NEMA abrasion resistance standards comprising a substrate having a decorative upper layer, and a protective overlayer on top of said decorative layer, the improvement wherein: said protective overlayer is transparent and consists essentially of a cured thermoset resin formed of pre-cured resin particles and optionally mineral particles of fine particle size having a Moh hardness of at least 7 in a thermoset resin matrix, the index of refraction of said pre-cured resin particles being substantially the same as the index of refraction of said thermoset matrix.

2. A laminate according to claim 1, wherein said substrate is formed of wood, and said decorative upper layer is a resin impregnated decor sheet.

3. A laminate according to claim 1, wherein said substrate is a wood veneer.

4. A laminate according to claim 1, wherein said decorative layer comprises decor paper layer impregnated with a thermoset resin, and wherein said resin of said decor layer and said resin of said protective overlayer are the same resin.

5. A laminate according to claim 4, which is a low pressure laminate, and wherein said resin is selected from the group consisting of polyester resin and melamine resin.

6. A laminate according to claim 4, wherein said laminate is a high-pressure decorative laminate meeting NEMA standards, and said resin is selected from the group consisting of melamine resin, urea resin and dicyandiamide resin.

7. A laminate according to claim 1, wherein said transparent protective overlay further comprises said mineral particles of fine particle size having a mean particle size no greater than 50 µm.

8. A laminate according to claim 7, wherein said mineral particles are selected from the group consisting of alumina, silica and mixtures thereof.

9. A laminate according to claim 1, wherein said transparent protective overlayer further comprises an initial binder material.

10. A laminate according to claim 9, wherein said initial binder material is selected from the group consisting of microcrystalline cellulose, carboxy methyl cellulose, sodium alginate and mixtures thereof.

11. A laminate according to claim 4, wherein said transparent protective overlayer further includes said mineral particles of fine particle size having a Moh hardness of at least 7 and an initial binder material.

12. A laminate according to claim 11, wherein said transparent protective overlayer has a thickness of about 2–3 mils.

13. An abrasion resistant decorative laminate comprising a core and a single surface lamina positioned thereover, said surface lamina comprising a decor sheet impregnated with a thermoset laminating resin and coated with a protective overlayer consisting essentially of:
  (1) from about 5 to about 30 parts by weight of a particulate mineral selected from the group consisting of alumina, silica and mixtures thereof;
  (2) from about 1 to about 5 parts by weight of an initial binder material selected from the group consisting of microcrystalline cellulose, sodium alginate, carboxy methyl cellulose and mixtures thereof;

(3) an amount of pre-cured resin particles at least equal to the amount of said particulate mineral up to 6X the amount of said mineral particulate; and (4) an amount sufficient of said thermoset laminating resin having an index of refraction substantially the same as the index of refraction of said pre-cured resin particles to form a permanent matrix for said particulate mineral and said pre-cured resin particles, said protective overlayer being clear and transparent.

14. In a decorative consolidated laminate consisting of a rigidity imparting core layer, a decorative paper sheet impregnated with a noble thermoset resin supported on the core layer, and a protective overlayer on the decorative sheet, the decorative sheet being clearly visible through the protective overlayer, the improvement wherein:

the protective overlayer consists essentially of a thermoset noble resin matrix, particles of pre-cured resin having the same index of refraction as said noble thermoset resin and wherein substantially all of said pre-cured resin particles have a size less than 250 μm, and optionally up to 100 parts by weight per 100 parts of pre-cured resin particles of a finely divided colorless abrasion-resistant mineral particulate material having a Moh hardness of at least 7 and a mean particle size not greater than 50 μm, and when said finely divided abrasion resistant mineral particulate material is present, said protective overlayer also includes an amount sufficient of an initial binder material to retain the mineral particles and pre-cured resin particulates in place on the surface of said decorative paper sheet.

15. A laminate according to claim 11 wherein said resin is melamine resin.

16. A laminate according to claim 15 wherein said overlay comprises approximately 15-20 lbs. per ream of said pre-cured melamine particles.

17. A laminate according to claim 15 wherein said transparent protective overlay is present in a thickness corresponding to approximately 6-8 lbs. per ream of said pre-cured resin particles and said mineral particles.

18. A decor sheet for use in the manufacture of a decorative laminate comprising a sheet of thermosettable resin impregnated paper having a protective overlayer thereon, said protective overlayer being substantially transparent and consisting essentially of pre-cured thermoset resin particles and optionally mineral particles of fine particle size having a Moh hardness of at least 7 in a thermosettable resin matrix, the index of refraction of said pre-cured resin particles being substantially the same as the index of refraction of said thermosettable resin, and optionally an initial binder material.

19. In a method of making a decorative laminate meeting NEMA abrasion resistant standards comprising assembling a substrate and a decorative upper layer into an assembly, said decorative upper layer being impregnated with a thermosettable resin and having a protective overlayer thereon, and subjecting said assembly to heat and pressure so as to cause flowing and at least partial curing of said thermosettable resin, the improvement wherein:

said protective overlayer is transparent and consists essentially of a cured thermoset resin formed of pre-cured resin particles and optionally mineral particles of fine particle size having a Moh hardness of at least 7 in a thermosettable resin matrix compatible with the thermosettable resin impregnant of said decorative upper layer, the index of refraction of said pre-cured resin particles being substantially the same as the index of refraction of said thermosettable resin of said matrix in at least partially cured form, and optionally an initial binder material.

20. In a method of preparing a decor sheet for use in the manufacture of decorative laminates, comprising coating said decor sheet with a protective overlayer and impregnating said decor sheet with a thermosettable resin, the improvement wherein:

said protective overlayer consists essentially of pre-cured thermoset resin particles and optionally mineral particles of fine particle size having a Moh hardness of at least 7, the index of refraction of said pre-cured resin particles being substantially the same as the index of refraction of said thermosettable resin matrix; and when said fine mineral particles are present also an initial binder material.

21. A laminate according to claim 9, wherein said transparent protective overlay further comprises said mineral particles of fine particle size having a mean particle size no greater than 50 μm.

22. A laminate according to claim 21, wherein said initial binder material is selected from the group consisting of microcrystalline cellulose, carboxy methyl cellulose, sodium alginate and mixtures thereof.

23. A decor sheet in accordance with claim 18, wherein said pre-cured resin particles and said thermosettable resin are the same resin.

24. A decor sheet according to claim 23, wherein said same resin is selected from the group consisting of polyester resin, melamine resin, urea resin and dicyandiamide resin.

25. A decor sheet in accordance with claim 18, wherein said protective overlayer comprises said mineral particles of fine particle size having a mean particle size no greater than 50 μm.

26. A decor sheet according to claim 25, wherein said protective overlayer comprises said initial binder material, and wherein said initial binder material is selected from the group consisting of microcrystalline cellulose, carboxymethylcellulose, sodium alginate and mixtures thereof.

27. A decor sheet according to claim 18, wherein said protective overlayer comprises said initial binder material, and wherein said initial binder material is selected from the group consisting of microcrystalline cellulose, carboxymethylcellulose, sodium alginate and mixtures thereof.

28. A decor sheet according to claim 18, wherein said transparent protective overlayer has a thickness of up to about 3 mils.

29. A method according to claim 20, wherein said coating and said impregnating are carried out in two separate steps, said method comprising first carrying out said coating by applying a wet layer of said pre-cured thermoset resin particles, said initial binder material and said mineral particles;

drying said wet layer; and impregnating said decor sheet with said thermosettable resin.

30. A method according to claim 29, wherein said initial binder material comprises microcrystalline cellulose and said drying is carried out at a temperature of at least about 140° F.; said pre-cured thermoset resin particles are formed of the same resin as said thermosettable resin, said same resin being selected from the group consisting of polyester resin, melamine resin, urea resin and dicyandiamide resin; and said coating is applied at a rate such that after drying, said protective overlayer has a thickness no greater than about 3 mils.

31. A method in accordance with claim 20, wherein said coating and said impregnating of said decor sheet are carried out in essentially one step, said method comprising preparing a mixture of said thermosettable resin, said pre-cured thermoset resin particles, said mineral particles of fine particle size and said initial binder material, said mixture having a viscosity no greater than about 250 cp;

applying said mixture to a surface of said decor sheet so as to simultaneously deposit a layer of said pre-cured resin particles, said mineral particles of fine particle size and said binder material, and simultaneously to impregnate said decor sheet with said thermosettable resin; and drying said coated and impregnated decor sheet.

32. A method according to claim 31, wherein said initial binder material comprises microcrystalline cellulose; said thermosettable resin and said pre-cured thermoset resin particles are the same resin and said resin selected from the group consisting of melamine resin and polyester resin; and said mixture is applied at a rate such that after drying, said protective overlayer has a thickness no greater than about 3 mils.

* * * * *